3,069,773
DENTAL PORCELAINS
Jacob A. Saffir, Los Angeles, Calif., assignor to The Dentists' Supply Company of New York, York, Pa., a corporation of New York
No Drawing. Filed June 11, 1959, Ser. No. 819,534
7 Claims. (Cl. 32—8)

This invention relates to the art of ceramics in dentistry and more particularly to the art of ceramic compositions as used in the manufacture of porcelain dental items such as artificial teeth, crowns, bridge pontics, denture bases, fillings, and other dental restorations for which porcelain is desirable.

Porcelain is one of the most important materials used in dentistry. It lends itself to the manufacturing of the most esthetic dental restorations since it can be colored to resemble closely the teeth or tissues it must replace.

It has the advantage of excellent chemical qualities since it is insoluble in the normal fluids of the oral cavity and in practically any given food or drink likely to pass through the oral cavity. It is also chemically able to resist the acid or alkali materials frequently used for washing artificial tooth members. Also to be considered is the fact that tissues are very tolerant of its presence and remain normal after years of contact.

Porcelain does have, however, one great disadvantage. It is quite breakable and repairs are difficult and costly. Because of the hazard of fragility, its use is curtailed and dentists have resorted to materials generally much less esthetic but having greater resistance to fracturing.

It is an object of this invention to strengthen dental porcelains and reduce their frangibility.

It is another object of this invention to improve the esthetics of porcelain artificial teeth and dentures.

Still another object of this invention is to attain artificial teeth and dentures with greater resistance to checking or cracking within substantial temperature ranges.

A further object of this invention is to achieve artificial teeth with greater impact strength and hence greater resistance to chipping.

Other objects, advantages, and features of the invention will become apparent from the following disclosure, which is intended to be illustrative and not limitative in scope.

This invention comprises the use of highly refractory glass fibers intermixed with the ceramic compositions now employed for the making of various porcelain items for dental use.

The prior art practice has been predicated on the concept of utilizing very finely milled powders, preferably milled to a particle size to pass a 170 mesh sieve. To this powdered porcelain is added water and a binder for the purpose of producing a mass that is plastic which can be shaped to whatever form is needed.

The binder is generally starch, sugar, dextrin, gum tragacanth, or any other material capable of holding the powdered porcelain together during the manipulation and disposable by burning in the furnace where the porcelain item is placed for fusing.

It can be seen that the evaporation and burning of the binder will leave spaces, small though they may be, between the particles of porcelain that it was their duty to hold together during the molding period.

Porcelain is generally composed of several materials such as fritted ground feldspar, magnesium silicate, kaolin, boric oxide and various other ingredients, depending on the type of porcelain desired. It can be seen that the coefficient of expansion in each of these materials may vary to a smaller or greater degree so that there is a tendency for differing particles not to adhere to each other but instead to part from one another when the binder and moisture are removed and each particle is left to expand or contract to its own coefficient.

It has been noted that, when placed into a kiln for burning, ceramic compositions for making porcelain crack into many pieces between the temperatures of 700° F. and 1100° F., after which, when much higher temperatures are reached, they begin to fuse and coalesce to form a mass that is more or less a solid but which is shown to have trapped within it a considerable number of air bubbles.

Due to the high viscosity of molten porcelain, even the high vacuums used in furnaces during the fusing period generally serves to remove bubbles only from the surface, leaving the porcelain in the interior, generally with imperfect coalescence and full of minute air spaces.

In accordance with the present invention is has been found that the addition of from 5% to 67% of highly refractory glass fibers to dental porcelain compositions greatly increases the physical strength of the end dental product.

Indicative of an expedient procedure for obtaining highly refractory glass fibers is that disclosed by the patents to John C. McMullen, No. 2,873,197, and No. 2,557,834. In accordance with these disclosures a highly refractory glass fiber fusing at substantially over 2500° F. can be made by fusing the following:

Parts by weight
Silica _____ 40 to 60
Alumina _____ 20 to 45
Zirconia _____ 3½ to 20 with the silica to alumina weight ratio of at least 1.

If desired, the above described compositions may contain, in addition to 100 parts by total weight of silica, alumina and zirconia, up to about six parts by weight of a modifying agent such as borax glass, without apparent detrimental effect on the physical nature thereof.

An example of the procedure from the raw batch to the final fiber is given in Patent No. 2,873,197.

The following composition by weight was prepared:

A-1 grade white alumina ore_____ 42.75
White sand _____ 49.75
Zircon _____ 7.50

The above composition, thoroughly mixed, was fused in an arc furnace of the type commonly used for making alumina abrasive materials until a substantial bath of molten material was obtained. The furnace was then tilted to allow the molten material to pour from the furnace in the form of a small stream that impinged on the periphery of one of the two twelve inch rotors that were rotating at about 4200 r.p.m. The axes of the two rotors were substantially parallel with about a three inch space between their motor's peripheries. The stream of molten material was dissipated in the form of fine fibrous material, and the following was given as a typical chemical analysis of the resulting fibrous material:

Percent
Alumina _____ 42.75
Silica _____ 52.25
Zirconia _____ 5.00

An extremely high percentage of the fibrous material was in the form of long fibers, up to six inches in length with a diameter of four microns, highly refractory in character, withstanding temperatures of 2562° F. over protracted periods of time without losing springiness or resilience.

The addition of these highly refractory fibers to dental ceramic compositions is in a sense similar to reinforcing concrete with steel. This fiber holds the ceramic composition in place during the first stages of firing when water content is evaporated and binder materials are being burned out. These fibers, cut to lengths of from 1/100" to 1/4", form a network through the porcelain, a framework for holding the fusing porcelain particles more firmly together. Their presence retards the easy flow of the fusing porcelain, a movement which often tends to subdue the fine markings and carvings carefully entered upon the porcelain mass to be fired. Surface markings now have a better chance to be retained in entirety and resulting teeth or dentures will be more nearly as they were sculptured, making for results that are more true and hence more esthetic.

The use of highly refractory glass fibers makes possible a reduction in the amount of binder required other than water and in many instances entirely substitutes for the binder. Since it is the burning out of the binder that leaves the voids and bubbles so undesirable in finished dental porcelain items, it can be seen that by using glass fibers a much denser porcelain is obtained.

If desired, these highly refractory glass fibers may be given a thin coating of some substance suitable for strengthening the fiber and this coating may be combustible or not combustible at porcelain fusing temperatures. Recommended are starch, phenol formaldehyde, glycol dimethacrylate polyamide, butyl methacrylate, polyvinol butyl, polyvinol acetal and polyvinol formal and combinations thereof, any other coating which will strengthen the fibers through the period of the manipulation of the porcelain composition.

It is preferable that this coating be qutie thin and consist of only about .02% by weight of the fiber itself. Also, where a protective coat on fibers is desirable, it must be allowed to dry before cutting into short lengths is attempted. Cutting may be accomplished by any expedient that severs the fibers or by hammermilling.

Since these highly refractory fibers are added as an inert filler to the ceramic porcelain composition, their full value as an ever present reinforcing agent and framework is best obtained when fibers used have a fusing point of at least one or two hundred degrees above the fusing point of the fusible ceramic used.

Also, since the addition of glass fibers may impart a slight degree of opacity, it is understood that their use will be selective. In the baking of a tooth structure, for example, the fibers will be added perhaps only to the dentin portion, but their presence will impart strength and durability to the entire tooth. Similarly, by adding fibers to portions of a denture, denture base, or any prosthetic appliance where slight opacity is not a drawback, not only those areas but the entire restoration will be better suited to long wearing.

The use of these highly refractory glass fibers makes possible another way to increase the esthetic results of the porcelain compositions to which they are added. Coloring matter can be incorporated. This means that now can be simulated the thousands of small capillaries in tissues, the enamel rods in natural enamel, blood vessels, or any natural contrast or occurrence in structure or tissue that it would be an asset to duplicate.

It is understood that dyes for this purpose must withstand high temperatures, must be inorganic, and should preferably be added, in minute amounts, to the original formula given earlier for the making of the highly refractory glass fiber itself. To obtain a good gum color, for example, cadmium selenide red is suggested. A variation in amount used will give pinks. Titanium oxide is satisfactory for light browns, antimony pentoxide and yellow chromium oxide for browns. Glass fibers of various colors and differing shades may be desirable in the same dental prosthesis for a better final effect. Then, too, glass fibers of more than one color can be used at the same time While the invention has been described in accordance with desirable embodiments and details of procedure, it is obvious that many changes and modifications may be made in the details thereof and in the characteristics of the compositions and articles obtained therefrom without departing from the spirit of the invention as defined in the following claims.

I claim:

1. A composition for the fabricating of various porcelain dental prosthetic appliances, comprising a porcelainous material and at least 5% by weight of highly refractory glass fibers, said fibers having a fusing point higher than the point of vitrification of said porcelainous material 2. A composition adapted for the fabricating of various vitrified porcelain dental prosthetic appliances, comprising a vitrifiable porcelainous material and at least 5% by weight of an amount of highly refractory glass fibers, said fibers precoated with a thin layer of a plastic material said highly refractory fibers having a fusing point higher than the point at which said porcelainous material vitrifies 3. A ceramic composition adapted for dental prostheses containing a porcelainous material and tinted, highly refractory glass fiber in proportion by weight of from 5 to 67%, said highly refractory glass fiber having a fusing point higher than the point of vitrification of said porcelainous material.

4. An artificial porcelain tooth comprising a body of dentin portion and a covering or enamel portion, highly refractory glass fibers incorporated in said body portion tinted to simulate the dentin portion as found in a natural tooth and highly refractory glass fibers incorporated in said covering portion tinted to simulate enamel as found in a natural tooth, said highly refractory glass fibers having a fusing point higher than the temperature at which the porcelain from which the enamel and body portion are formed is fired to vitrify it.

5. An artificial dental appliance comprised of a vitrified dental ceramic composition, some portions of said artificial appliance having incorporated therein inert glass fibers of more highly refractory nature than said ceramic composition.

6. An artificial dental appliance comprised of a vitrified dental ceramic composition into which is incorporated highly refractory glass fibers having a fusing point higher than the temperature at which the ceramic composition vitrifies to form an inert network for strengthening said dental appliance.

7. A dental ceramic material of which to form vitrified porcelain teeth said material comprising pulverized unfired porcelain material and refractory glass fibers having a melting point higher than the temperature of vitrification of said porcelain material intimately admixed therewith, said glass fibers having a thin coating thereon of material suitable for strengthening the fiber during manipulation of the material.

References Cited in the file of this patent

UNITED STATES PATENTS

| 2,793,436 | Gotlib | May 28, 19 |
| 2,873,197 | McMullen | Feb. 10, 19 |